Reissued May 28, 1940

Re. 21,464

UNITED STATES PATENT OFFICE 21,464

CONVERSION OF HYDROCARBONS

Jacque C. Morrell, Chicago, Ill., assignor to Universal Oil Products Company, Chicago, Ill., a corporation of Delaware No Drawing. Original No. 2,124,583, dated July 26, 1938, Serial No. 103,393, September 30, 1936. Application for reissue September 15, 1939, Serial No. 295,107

8 Claims. (Cl. 260—668)

This invention relates particularly to the conversion of straight chain hydrocarbons into closed chain or cyclic hydrocarbons.

More specifically, it is concerned with a process involving the use of special catalysts and specific conditions of operation in regard to temperature, pressure and time of reaction whereby aliphatic hydrocarbons can be efficiently converted into aromatic hydrocarbons.

In the straight pyrolysis of pure hydrocarbons or hydrocarbon mixtures such as those encountered in fractions from petroleum or other naturally occurring or synthetically produced hydrocarbon mixtures the reactions involved which produce aromatics from paraffins and olefins are of an exceedingly complicated character and cannot be very readily controlled.

It is generally recognized that, in the thermal decomposition of hydrocarbon compounds or hydrocarbon mixtures of relatively narrow range than whatever intermediate reactions are involved, there is an overall loss of hydrogen, a tendency to carbon separation and a generally wider boiling range in the total liquid products as compared with the original charge. Under mild cracking conditions involving relatively low temperatures and pressures and short times of exposure to cracking conditions it is possible to some extent to control cracking reactions so that they are limited to primary decompositions and there is a minimum loss of hydrogen and a maximum production of low boiling fractions consisting of compounds representing the fragments of the original high molecular weight compounds.

As the conditions of pyrolysis are increased in severity using higher temperatures and higher times of exposure to pyrolytic conditions, there is a progressive increase in loss of hydrogen and a large amount of secondary reactions involving recombination of primary radicals to form polymers and some cyclization to form naphthenes and aromatics, but the mechanisms involved in these cases are of so complicated a nature that very little positive information has been evolved in spite of the large amount of experimentation which has been done and the large number of theories proposed. In general, however, it may be said that, starting with paraffin hydrocarbons representing the highest degree of saturation, these compounds are changed progressively into olefins, naphthenes, aromatics, and finally into carbon and hydrogen and other light fixed gases. It is not intended to infer from this statement that any particular success has attended the conversion of any given paraffin or other aliphatic hydrocarbon into an aromatic hydrocarbon of the same number of carbon atoms by way of the progressive steps shown. If this is done it is usually with very low yields which are of very little practical significance.

The search for catalysts to specifically control and accelerate desired conversion reactions among hydrocarbons has been attended with the usual difficulties encountered in finding catalysts for other types of reactions since there are no basic laws or rules for predicting the effectiveness of catalytic materials and the art as a whole is in a more or less empirical state. In using catalysts even in connection with conversion reactions among pure hydrocarbons and particularly in connection with the conversion of the relatively heavy distillates and residua which are available for cracking, there is a general tendency for the decomposition reactions to proceed at a very rapid rate, necessitating the use of extremely short time factors and very accurate control of temperature and pressure to avoid too extensive decomposition. There are further difficulties encountered in maintaining the efficiency of catalysts employed in pyrolysis since there is usually a rapid deposition of carbonaceous materials on their surfaces and in their pores.

The foregoing brief review of the art of hydrocarbon pyrolysis is given to furnish a general background for indicating the improvements in such processes which are embodied in the present invention, which may be applied to the treatment of pure paraffin or olefin hydrocarbons, hydrocarbon mixtures containing substantial percentages of paraffin hydrocarbons such as relatively close cut fractions producible by distilling petroleum, and analogous fractions which contain unsaturated as well as saturated straight chain hydrocarbons, such fractions resulting from cracking operations upon the heavier fractions of petroleum.

In one specific embodiment, the present invention comprises the conversion of aliphatic hydrocarbons including paraffin and olefin hydrocarbons into aromatic hydrocarbons by subjecting them at elevated temperatures of the order of 400–700° C. to contact for definite times of the order of 6–50 seconds with catalytic materials comprising major proportions of refractory carriers of relatively low catalytic activity supporting minor proportions of compounds of elements selected from those occurring in the lefthand column of group IV of the periodic table, the compounds having relatively high catalytic activity.

According to the present invention, aliphatic or straight chain hydrocarbons having 6 or more carbon atoms in chain arrangement in their structure are specifically dehydrogenated in such a way that the chain of carbon atoms undergoes ring closure with the production in the simplest case of benzene from n-hexane or n-hexene and in the case of higher molecular weight paraffins or various alkyl derivatives of benzene. Under properly controlled conditions of times of contact, temperature and pressure very high yields of the order of 75 to 90% of the benzene or aromatic compounds are obtainable in the art either with or without catalysts. For the sake of illustrating and exemplifying the types of hydrocarbon conversion reactions which are specifically accelerated under the preferred conditions by the present types of catalysts, the following structural equations are introduced:

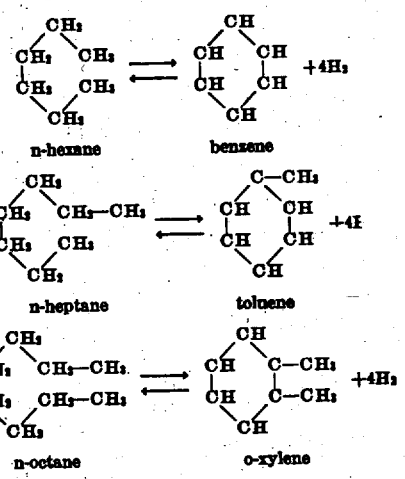

In the foregoing table the structural formulas of the primary paraffin hydrocarbons have been represented as a nearly closed ring instead of by the usual linear arrangement for the sake of indicating the possible mechanisms involved. No attempt has been made to indicate the possible intermediate existence of mono-olefins, diolefins hexamethylenes or alkylated hexamethylenes which might result from the loss of various amounts of hydrogen. It is not known at the present time whether ring closure occurs at the loss of one hydrogen molecule or whether dehydrogenation of the chain carbons occurs so that the first ring compound formed is an aromatic such as benzene or one of its derivatives. The above three equations are of a relatively simple character indicating generally the type of reactions involved but in the case of n-paraffins or mono-olefins of higher molecular weight than the octane shown and in the case of branch chain compounds which contain various alkyl substituent groups in different positions along the six-carbon atom chain, more complicated reactions will be involved. For example, in the case of such a primary compound as 2,3-dimethyl hexane the principal resultant product is apparently o-xylene although there are concurrently produced definite yields of such compounds as ethyl benzene indicating an isomerization of two substituent methyl groups. In the case of nonanes which are represented by the compound 2,3,4-trimethyl hexane, there is formation not only of mesitylene but also of such compounds as methyl ethyl benzol and various propyl benzols.

It will be seen from the foregoing that the scope of the present invention is preferably limited to the treatment of aliphatic hydrocarbons which contain at least 6 carbon atoms in straight chain arrangement. In the case of paraffin hydrocarbons containing less than 6 carbon atoms in linear arrangement, some formation of aromatics may take place due to primary isomerization reactions although obviously the extent of these will vary considerably with the type of compound and the conditions of operation. The process is readily applicable to paraffins from hexane up to dodecane and their corresponding olefins. With increase in molecular weight beyond this point the percentage of undesirable side reactions tends to increase and yields of the desired alkylated aromatics decrease in proportion.

The present invention is characterized by the use of a particular group of composite catalytic materials which employ as their base catalysts certain refractory oxides and silicates which in themselves may have some slight specific catalytic ability in the dehydrogenation and cyclization reactions but which are improved greatly in this respect by the addition of certain promoters or secondary catalysts in minor proportions. These base supporting materials are preferably of a rugged and refractory character capable of withstanding the severe use to which the catalysts are put in regard to temperature during service and in regeneration by means of air or other oxidizing gas mixtures after they have become fouled with carbonaceous deposits after a period of service. As examples of materials which may be employed in granular form as supports for the preferred catalytic substances may be mentioned the following:

| | |
|---|---|
| Magnesium oxide | Montmorillonite clays |
| Aluminum oxide | Kieselguhr |
| Bauxite | Crushed firebrick |
| Bentonite clays | Crushed silica |

Glauconite (greensand)

It should be emphasized that in the field of catalysis there have been very few rules evolved which will enable the prediction of what materials will catalyze a given reaction. Most of the catalytic work has been done on a purely empirical basis, even though at times certain groups of elements or compounds have been found to be more or less equivalent in accelerating certain types of reactions.

In regard to the base catalytic materials which are preferably employed according to the present invention, some precautions are necessary to insure that they possess proper physical and chemical characteristics before they are impregnated with the promoters to render them more efficient. In regard to magnesium oxide, which may be alternatively employed, this is most conveniently prepared by the calcination of the mineral magnesite which is most commonly encountered in a massive or earthy variety and rarely in crystal form, the crystals being usually rhombohedral. In many natural magnesites the magnesium oxide may be replaced to the extent of several percent by ferrous oxide. The mineral is of quite common occurrence and readily obtainable in quantity at a reasonable figure. The pure compound begins to decompose to form the oxide at a temperature of 350° C., though the rate of decomposition only reaches a practical value at considerably higher temperatures, usually of the order of 800° C. to 900° C. Magnesite is related to Dolomite, the mixed carbonate of calcium and magnesium, which latter mineral, however, is not of as good service as the relatively pure magnesite in the present instance. Magnesium carbonate prepared by precipitation or other chemical methods may be used alternatively in place of the natural mineral, this permitting its use as the active constituent of masses containing spacing materials of relatively inert character and in some cases allowing the production of catalysts of higher efficiency and longer life. It is not necessary that the magnesite be completely converted to oxide but as a rule it is preferable that the conversion be at least over 90%, that is, so that there is less than 10% of the carbonate remaining in the ignited material.

Aluminum oxide which is generally preferable as a base material for the manufacture of catalysts for the process may be obtained from natural aluminum oxide minerals or ores such as bauxite or corbonates such as dawsonite by proper calcination, or it may be prepared by precipitation of aluminum hydrate from solutions of aluminum sulfate or different alums, and dehydration of the precipitate of aluminum hydroxide by heat, and usually it is desirable and advantageous to further treat it with air or other gases, or by other means to activate it prior to use.

Two hydrated oxides of aluminum occur in nature, to-wit, bauxite having the formula $Al_2O_3.2H_2O$ and diaspore $Al_2O_3.H_2O$. In both of these oxides iron sesqui-oxide may partially replace the alumina. These two minerals or corresponding oxides produced from precipitated aluminum hydroxide are particularly suitable for the manufacture of the present type of catalysts and in some instances have given the best results of any of the base compounds whose use is at present contemplated. The mineral dawsonite having the formula $Na_3Al(CO_3)_3.2Al(OH)_3$ is another mineral which may be used as a source of aluminum oxide.

It is best practice in the final steps of preparing aluminum oxide as a base catalyst to ignite for some time at temperatures within the same approximate range as those employed in the ignition of magnesite, to-wit, from 800–900° C. This probably does not correspond to complete dehydration of the hydroxides but apparently gives a catalytic material of good strength and porosity so that it is able to resist for a long period of time the deteriorating effects of the service and regeneration periods to which it is subjected. In the case of the clays which may serve as base catalytic materials for supporting promoters, the better materials are those which have been acid-treated to render them more siliceous. These may be pelleted or formed in any manner before or after the addition of the promoter catalyst since ordinarily they have a high percentage of fines. The addition of certain of the promoters, however, exerts a binding influence so that the formed materials may be employed without fear of structural deterioration in service.

Our investigations have also definitely demonstrated that the catalytic efficiency of such substances as alumina, magnesium oxide, and clays which may have some catalytic potency in themselves is greatly improved by the presence of compounds of the preferred elements in relatively minor amounts, usually of the order of less than 10% by weight of the carrier. It is most common practice to utilize catalysts comprising 2 to 5% by weight of these compounds, particularly their lower oxides.

The promoters which are used in accordance with the present invention to produce active catalysts of the base materials include generally compounds and more particularly oxides of the elements in the lefthand column of group IV of the periodic table including titanium, zirconium, cerium, hafnium and thorium. In general practically all of the compounds of the preferred elements will have some catalytic activity though as a rule the oxides and particularly the lower oxides are the best catalysts. Catalyst composites may be prepared by utilizing the soluble compounds of the elements in aqueous solutions, from which they are absorbed by granular carriers or from which they are deposited upon the carriers by evaporation of the solvent. The invention further comprises the use of catalyst composites made by mixing relatively insoluble compounds with carriers either in the wet or the dry condition. In the following paragraphs some of the compounds of the elements listed above are given which are soluble in water and which may be used to add catalytic material to carriers. The known oxides of these elements are also listed.

Titanium

Compounds which will ultimately yield titanium catalysts on heating to a proper temperature are absorbed by stirring them with warm aqueous solutions of soluble titanium compounds, such as for example titanium nitrate having the formula $5TiO_2.N_2O_5.6H_2O$, which is sufficiently soluble in warm water to render it readily utilizable as a source of titanium oxides. Other soluble compounds which may be used to form catalytic deposits containing titanium are the various alkali metal titanates. Other compounds of titanium acids, including compounds of the alkaline earth and heavy metals may be distributed upon the carriers by mechanical mixing either in the wet or the dry condition. The lower oxides are generally the best catalysts. The oxide resulting from the decomposition of such compounds as the nitrate and the hexahydrate is for the most part the dioxide $TiO_2$. This oxide, however, is reduced by hydrogen, or by the gases and vaporous products resulting from the decomposition of the mono-olefins treated in the first stages of the reactions so that the essential catalyst for the larger portion of the period of service is the sesquioxide $Ti_2O_3$.

Zirconium

The soluble compounds of zirconium which may be used as primary sources of catalytic materials in aqueous solution include the slightly soluble zirconium ammonium fluoride, the tetrachloride, the fluoride, the iodide and particularly the more soluble selenate and sulfate. The crystalline selenate has the formula $Zr(SeO_4)_2.4H_2O$ and the sulfate which is the more soluble of the two, has the formula $Zr(SO_4)_2.4H_2O$. As in the case of the other alternative elements the tetrahydroxide may be precipitated from a solution of the sulfate or other soluble salt onto the surface and into the pores of an active granular carrier by the addition of alkaline carbonate or hydroxide precipitants, after which the zirconium hydroxide is ignited to produce the dioxide. The principal oxide of zirconium is the dioxide and there is little evidence to indicate the existence of a monoxide since the dioxide is not reducible by hydrogen at moderate temperatures and it has been shown that carbon in the electric furnace reduces the dioxide directly to the metal.

Cerium

A properly prepared and activated carrier is ground and sized to produce granules of relatively small mesh of the approximate order of from 4 to 20 and these may be caused to absorb compounds which will ultimately yield compounds of cerium on heating to a proper temperature by stirring them with warm aqueous solutions of soluble cerium compounds, such as for example cerium nitrate having the formula $Ce(NO_3)_3.6H_2O$, which is sufficiently soluble in warm water to render it readily utilizable as a source of cerium oxides. Other soluble compounds which may be used to form catalytic deposits containing cerium are the various alkali metal cerous nitrates, such as for example sodium cerous nitrate having the formula $2NaNO_3.Ce(NO_3)_3.H_2O$. Other compounds of ceric acids, including compounds of the alkaline earth and heavy metals, may be distributed upon the carrier by mechanical mixing either in the wet or the dry condition. As a rule the lower oxides including the trioxide $CeO_3$, the dioxide $CeO_2$, the heptoxide $Ce_4O_7$, and sesquioxide $Ce_2O_3$. The dioxide results from the ignition of cerous nitrate, cerous sulfate, cerous carbonate or cerous oxalate and also from the ignition of ceric nitrate, ceric sulfate or ceric hydroxide. Hydrogen reduces the dioxide to the heptoxide, and it is probable that this oxide plus a certain amount of the sequioxide are active catalysts.

Hafnium

In general the properties of hafnium from a chemical and to some extent a catalytic standpoint are intermediate between those of zirconium and thorium though in most reactions hafnium compounds more closely correspond to those of zirconium. There is but one known oxide, the dioxide $HfO_2$ and this oxide is not readily reducible and probably exists as such when used in minor proportions as a constituent of catalyst composites in hydrocarbon dehydrogenation reactions. Soluble compounds of hafnium include the oxychloride having the formula $HfOCl_2.8H_2O$ and the oxalate which is soluble in an excess of oxalic acid. The mixing of this oxalate solution with the miscellaneous carriers proposed and the evaporation of the solution gives a residual material which can be ignited to leave a residue of the dioxide. Hafnium sulfide catalysts may be developed by igniting composites of relatively inert carriers and hafnium sulfate at temperatures of about 500° C. On account of the rarity of hafnium its compounds are seldom commercially utilizable although the oxide in particular has been found to exert a good catalytic influence in the types of reactions under consideration.

Thorium

The element thorium furnishes a number of compounds which can be used as primary sources of catalytic material for deposition upon the types of carriers disclosed. The following compounds are sufficiently soluble in water to enable them to be used in aqueous solution to saturate prepared granular carrier particles: the bromide $ThBr_4$, the chloride $ThCl_4$, the iodide $ThI_4$, and the nitrate $Th(NO_3)_4$ which is most conveniently used as the tetrahydrated or dodecahydrated salt. From any of the soluble salts mentioned the tetrahydroxide $Th(OH)_4$ may be precipitated by the use of alkali carbonates or alkali hydroxides and then ignited to produce the dioxide. The phosphates and sulfates and the sulfide are relatively insoluble and may be incorporated with the carrier particles either in the wet or the dry condition. The nitrate may be directly ignited, of course, to produce the dioxide.

While the identification of some other oxides of thorium such as the pentatrioxide $Th_3O_5$ and the monoxide ThO has been claimed as well as a peroxide having the formula $Th_2O_7$, it has been shown that the principal oxide catalyst in operations of the present character is the ordinary dioxide. It is to be emphasized that the oxide is the preferred catalyst since in general it exhibits greater and more selective catalytic action than any other compounds which may be formed upon the carrier surfaces.

The most general method for adding promoting materials to the preferred base catalysts, which if properly prepared have a high adsorptive capacity, is to stir the prepared granules of from approximately 4 to 20 mesh into solutions of salts which will yield the desired promoting compounds on ignition under suitable conditions. In some instances the granules may be merely stirred in slightly warm solutions of salts until the dissolved compounds have been retained on the particles by absorption or occlusion, after which the particles are separated from the excess solvent by settling or filtration, washed with water to remove excess solution, and then ignited to produce the desired residual promoter. In cases of certain compounds of relatively low solubility it may be necessary to add the solution in successive portions to the adsorbent base catalyst with intermediate heating to drive off solvent in order to get the required quantity of promoter deposited upon the surface and in the pores of the base catalyst. The temperatures used for drying and calcining after the addition of the promoters from solutions will depend entirely upon the individual characteristics of the compound added and no general ranges of temperature can be given for this step.

In some instances promoters may be deposited from solution by the addition of precipitants which cause the deposition of precipitates upon the catalyst granules. As a rule methods of mechanical mixing are not preferable though in some instances in the case of hydrated or readily fusible compounds these may be mixed with the proper proportions of base catalysts and uniformly distributed during the condition of fusing or fluxing.

In regard to the relative proportions of base catalyst and promoting materials it may be stated in general that the latter are generally less than 10% by weight of the total composites. The effect upon the catalytic activity of these base catalysts caused by varying the percentage of any given compound or mixture of compounds deposited thereon is not a matter for exact calculation but more one for determination by experiment. Frequently good increases in catalytic effectiveness are obtainable by the deposition of as low as 1% or 2% of a promoting compound upon the surface and in the pores of the base catalyst, though the general average is about 5%.

It has been found essential to the production of high yields of aromatics from aliphatic hydrocarbons when using the preferred types of catalysts that depending upon the aliphatic hydrocarbon or mixtures of hydrocarbons being treated, temperatures from 400–700° C. should be employed, contact times of approximately 6 to 50 seconds and pressures approximating atmospheric. The use of subatmospheric pressures of the order of ¼ atmosphere may be beneficial in that reduced pressures generally favor selective dehydrogenation reactions but on the other hand moderately superatmospheric pressures usually of the order of less than 100 pounds per square inch tend to increase the capacity of commercial plant equipment so that in practice a balance is struck between these two factors. The times of contact most commonly employed with n-paraffinic or mono-olefinic hydrocarbons having from 6–12 carbon atoms to the molecule are of the order of 6–20 secs. It will be appreciated by those familiar with the art of hydrocarbon conversion in the presence of catalysts that the factors of temperature, pressure and time will frequently have to be adjusted from the results of preliminary experiments to produce the best results in any given instance. The criterion of the yield of aromatics will serve to fix the best conditions of operation. In a general sense the relations between time, temperature and pressure are preferably adjusted so that rather intensive conditions are employed of sufficient severity to insure a maximum amount of the desired cyclization reactions with a minimum of undesirable side reactions. If too short times of contact are employed the conversion reactions will not proceed beyond those of simple dehydrogenation and the yields of olefins and diolefins will predominate over those of aromatics.

While the present process is particularly applicable to the production of the corresponding aromatics from an aliphatic hydrocarbon or a mixture of aliphatic hydrocarbons, the invention may also be employed to produce aromatics from aliphatic hydrocarbon mixtures such as distillates from paraffinic or mixed base crude petroleum. In this case the aromatic character of the distillates will have increased and as a rule the octane number will be higher. If desired and found feasible on a basic of concentration, the aromatics produced in the hydrocarbon mixture may be rerecovered as such by distillation into fractions of proper boiling range followed by chemical treatment with reagents capable of reacting selectively with them. Another method of aromatic concentration will involve the use of selective solvents such as liquid sulfur dioxide, alcohols, furfural, chlorex, etc.

In operating the process the general procedure is to vaporize hydrocarbons or mixtures of hydrocarbons and after heating the vapors to a suitable temperature within the ranges previously specified, to pass them through stationary masses of granular catalytic material in vertical cylindrical treating columns or banks of catalyst-containing tubes in parallel connection. Since the reactions are endothermic it may be necessary to apply some heat externally to maintain the best reaction temperature. After passing through the catalytic zone the products are submitted to fractionation to recover cuts or fractions containing the desired aromatic product with the separation of fixed gases, unconverted hydrocarbons and heavier residual materials, which may be disposed of in any suitable manner depending upon their composition. The overall yield of aromatics may be increased by recycling the unconverted straight chain hydrocarbons to further treatment with fresh material, although this is a more or less obvious expedient and not specifically characteristic of the present invention.

It is an important feature of the present process that the vapors undergoing dehydrogenation should be free from all but traces of water vapor since the presence of any substantial amounts of steam reduced the catalytic selectivity of the composite catalysts to a marked degree. In view of the empirical state of the catalytic art, it is not intended to submit a complete explanation of the reasons for the deleterious influence of water vapor on the course of the present type of catalyzed reactions, but it may be suggested that the action of the steam is to cause a partial hydration of such basic carriers as alumina and magnesium oxide and some of the active catalytic compounds due to preferential adsorption so that in effect the hydrocarbons are prevented from reaching or being adsorbed by the catalytically active surface.

The present types of catalysts are particularly effective in removing hydrogen from chain compounds in such a way that cyclization may be promoted without removal of hydrogen from end carbon atoms so that both end and side alkyl groups may appear as substituents in benzene rings and it has been found that under proper operating conditions they do not tend to promote any great amount of undesirable side reactions leading to the deposition of carbon or carbonaceous materials and for this reason show reactivity over relatively long periods of time. When their activity begins to diminish after a period of service, it is readily regenerated by the simple expedient of oxidizing with air or other oxidizing gas at a moderately elevated temperature, usually within the range employed in the dehydrogenation and cyclization reactions. This oxidation effectively removes traces of carbon deposits which contaminate the particles and decrease their efficiency. It is characteristic of the present types of catalysts that they may be repeatedly regenerated with only a very gradual loss of catalytic efficiency.

During oxidation with air or other oxidizing gas mixture in regenerating partly spent material, there is evidence to indicate that when the lower oxides are employed, they are to a large extent, if not completely, oxidized to higher oxides which combine with basic carriers to form compounds of variable composition. Later these compounds are decomposed by contact with reducing gases in the first stages of service to reform the lower oxides and regenerate the real catalyst and hence the catalytic activity.

*Example I*

A n-hexane charge obtained by the careful fractionation of a Pennsylvania crude oil was found to have a boiling point of 68.8° C., and a refractive index of 1.3768 which corresponds closely to the properties of the pure compound. The general procedure for manufacturing the catalyst was to dissolve titanium nitrate in cold water and utilize this solution as a means of eventually adding titanium oxides to a carrier. A saturated solution of titanium nitrate in 100 parts of water was prepared and the solution was then added to about 250 parts by weight of activated alumina which had been produced by calcining bauxite at a temperature of about 700° C., followed by grinding and sizing to produce particles of approximately 8–12 mesh. Using the proportions stated, the alumina exactly absorbed the solution and the particles were first dried at 100° C., for about two hours and the temperature was then raised to 350° C., in a period of eight hours. After this calcining treatment the particles were placed in a reaction chamber and the titanium oxides reduced in a current of hydrogen at about 500° C., when they were then ready for service.

The hexane was vaporized and passed over the granular catalyst prepared as described, using a temperature of 515° C., substantially atmospheric pressure, and a time of contact of 18 secs. The yield of pure benzene under these conditions was found to be 47% by weight of the normal n-hexane charged. By recycling of the unconverted material the ultimate yield of benzene was raised to 77%.

*Example II* n-Heptane was treated with the same type of catalyst as in Example I at a temperature of 560° C., substantially atmospheric pressure and 13 secs. contact time. The yield of toluene on a once-through basis was found to be 48% by weight and again it was found that by recycling the unconverted n-heptane that the yield of the desired toluene could ultimately be brought to 77%.

*Example III*

To manufacture granular catalyst particles, activated alumina prepared by calcination at a temperature of about 1500° F., (the particles varying in size from approximately 10 to 20 mesh) were stirred in a moderately saturated solution of zirconium sulfate while adding a solution of sodium hydroxide to precipitate zirconium hydroxide on the alumina particles. Subsequent filtering and washing of the granules was followed by the ignition of the hydroxide to produce zirconium dioxide which acted as the catalyst. n-Hexane was vaporized and passed over the granular catalyst prepared as described, using a temperature of 968° F., substantially atmospheric pressure, and a time of contact of 17 seconds. The yield of pure benzene under these conditions was found to be 46% by weight of the n-hexane charged. By recycling of the unconverted material the ultimate yield of benzene was raised to 76%.

*Example IV*

Using a catalyst prepared generally in accordance with the procedure outlined in Example III, n-heptane was submitted to conversion conditions comprising a temperature of 555° C., atmospheric pressure and about 15 seconds contact time. A 50% yield of toluene was obtained in the first pass over the catalyst under these conditions and by recycling the ultimate yield was brought to about 75%.

*Example V*

The general procedure in the preparation of the catalyst was to dissolve cerous nitrate in water and utilize this solution as a means of adding cerium oxides to a carrier. 20 parts by weight of cerous nitrate was dissolved in about 100 parts by weight of water, and the solution was then added to about 250 parts by weight of activated alumina which had been produced by calcining bauxite at a temperature of about 700° C., followed by grinding and sizing to produce particles of approximately 8–12 mesh. Using the proportions stated the alumina exactly absorbed the solution and the particles were first dried at 100° C., for about two hours and the temperature was then raised to 350° C. in a period of eight hours. After this calcining treatment the particles were placed in a reaction chamber and the cerium dioxide reduced in a current of hydrogen at about 500° C., to produce the oxide $Ce_4O_7$ when they were then ready for service.

n-Hexane was vaporized and passed over the granular catalyst comprising an alumina base supporting about 4% by weight of the cerous oxides, using a temperature of 525° C., substantially atmospheric pressure, and a time of contact of 21 seconds. The yield of pure benzene under these conditions was found to be 44% by weight of the normal n-hexane charged. By recycling of the unconverted material the ultimate yield of benzene was raised to 74%.

*Example VI* n-Heptane was treated with the same type of catalyst as in Example V at a temperature of 570° C., substantially atmospheric pressure and 18 seconds contact time. The yield of toluene on a once-through basis was found to be 44% by weight and again it was found that by recycling the unconverted n-heptane that the yield of the desired toluene could ultimately be brought to 74%.

*Example VII*

As an example of the manufacture of aromatic hydrocarbons by dehydrogenation and cyclization of mono-olefins, the case of 1-heptane may be considered. A catalyst was employed which was manufactured by the same general procedure given in Example I and the vapors of the n-heptane were passed over the granular catalyst at a temperature of 500° C., substantially atmospheric pressure and 15 secs. contact time. A once-through yield of toluene amounting to 75% by weight of the heptane charged was obtained which was positively identified by its conversion to the dinitro compound which melted sharply at 65–66° C.

*Example VIII*

This example is introduced to indicate the possibilities in manufacturing benzol from hexenes according to the present process. Using a zirconium oxide catalyst prepared generally in accordance with the procedure outlined in Example III, 1-hexene was passed over the granular material at a temperature of 505° C., atmospheric pressure and about 18 seconds contact time. The yield of benzol was approximately 70% in a single pass and this could be increased to substantially 90% by recycling of the unconverted olefin.

I claim as my invention:

1. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a period of about 6 to 50 seconds, in the presence of a compound of a metal from the left hand column of group IV of the periodic table and selected from the class consisting of titanium, zirconium, cerium, hafnium and thorium.

2. A process for the production of aromatic hydrocarbons for aliphatic hydrocarbons of from six to twelve carbon atoms, which comprises dehydrogenating and cyclicizing the aliphatic hydrocarbon by subjection to a temperature of the order of 400 to 700° C., for a period of about 6 to 50 seconds, in the presence of an oxide of a metal from the left hand column of group IV of the periodic table and selected from the class consisting of titanium, zirconium, cerium, hafnium and thorium.

3. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a period of about 6 to 50 seconds, in the presence of a solid granular catalyst comprising essentially a major proportion of a carrier of relatively low catalytic activity supporting a minor proportion of a compound of a metal from the left hand column of group IV of the periodic table and selected from the class consisting of titanium, zirconium, cerium, hafnium and thorium.

4. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a period of about 6 to 50 seconds, in the presence of a solid granular catalyst comprising essentially a major proportion of a carrier of relatively low catalytic activity supporting a minor proportion of an oxide of a metal from the left hand column of group IV of the periodic table and selected from the class consisting of titanium, zirconium, cerium, hafnium and thorium.

5. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a time period of less than 50 seconds but sufficient to dehydrogenate and cyclicize the aliphatic hydrocarbon, in the presence of a compound of a metal from the left hand column of group IV of the periodic table and selected from the class consisting of titanium, zirconium, cerium, hafnium and thorium.

6. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a time period of less than 50 seconds but sufficient to dehydrogenate and cyclicize the aliphatic hydrocarbon, in the presence of an oxide of a metal from the left hand column of group IV of the periodic table and selected from the class consisting of titanium, zirconium, cerium, hafnium and thorium.

7. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a time period of less than 50 seconds but sufficient to dehydrogenate and cyclicize the aliphatic hydrocarbon, in the presence of a solid granular catalyst comprising essentially a major proportion of a carrier of relatively low catalytic activity supporting a minor proportion of a compound of a metal from the left hand column of group IV of the periodic table and selected from the class consisting of titanium, zirconium, cerium, hafnium and thorium.

8. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a time period of less than 50 seconds but sufficient to dehydrogenate and cyclicize the aliphatic hydrocarbon, in the presence of a solid granular catalyst comprising essentially a major proportion of a carrier of relatively low catalytic activity supporting a minor proportion of an oxide of a metal from the left hand column of group IV of the periodic table and selected from the class consisting of titanium, zirconium, cerium, hafnium and thorium.

JACQUE C. MORRELL.